United States Patent
Hill et al.

(10) Patent No.: US 10,350,992 B2
(45) Date of Patent: Jul. 16, 2019

(54) METHOD FOR CONTROLLING A PRESSURE INSIDE A FUEL TANK SYSTEM

(71) Applicant: Plastic Omnium Advanced Innovation and Research, Brussels (BE)

(72) Inventors: David Hill, Commerce Township, MI (US); Paul Daniel Reuther, Oxford, MI (US); Antoine Chaussinand, Brussels (BE)

(73) Assignee: Plastic Omnium Advanced Innovation and Research, Brussels (BE)

( * ) Notice: Subject to any disclaimer, the term of this patent is extended or adjusted under 35 U.S.C. 154(b) by 0 days.

(21) Appl. No.: 15/710,298

(22) Filed: Sep. 20, 2017

(65) Prior Publication Data

US 2018/0134149 A1    May 17, 2018

(30) Foreign Application Priority Data

Nov. 14, 2016   (EP) ..................... 16198716

(51) Int. Cl.
   *B60K 15/03*    (2006.01)
   *B60K 15/05*    (2006.01)
   *B60K 15/035*   (2006.01)

(52) U.S. Cl.
   CPC ...... *B60K 15/035* (2013.01); *B60K 15/03504* (2013.01); *B60K 15/03519* (2013.01);
   (Continued)

(58) Field of Classification Search
   CPC .................. B60K 15/035; B60K 15/03; B60K 2015/03302; B60K 2015/0358;
   (Continued)

(56) References Cited

U.S. PATENT DOCUMENTS

| 5,329,164 A | 7/1994 | Saito |
| 5,612,659 A * | 3/1997 | Kerber ................... H01M 2/34 |
| | | 307/10.7 |

(Continued)

FOREIGN PATENT DOCUMENTS

| DE | 42 28 781 | 3/1993 |
| DE | 10 2010 048843 | 4/2012 |

(Continued)

OTHER PUBLICATIONS

Search Report dated Feb. 26, 2018 in European Patent Application EP 17 19 1395.

(Continued)

*Primary Examiner* — George C Jin
(74) *Attorney, Agent, or Firm* — Oblon, McClelland, Maier & Neustadt, L.L.P.

(57) ABSTRACT

A method for controlling a pressure inside a fuel tank system on board a vehicle, the fuel tank system having a fuel tank and a venting circuit having at least one controllable pressure relief valve, the vehicle having a source of energy adapted to activate said at least one pressure relief valve so as to move it from a closed position to a pressure relief position. The method entails: detecting a key off event indicative of the vehicle shut-down; determining an amount of energy available at the source of energy; starting at least one pressure relief operation by verifying whether the amount of energy available is lower than a first predetermined threshold amount and, if the verification is positive, activating the at least one pressure relief valve; and terminating the at least one pressure relief operation.

11 Claims, 2 Drawing Sheets

Figure 1:
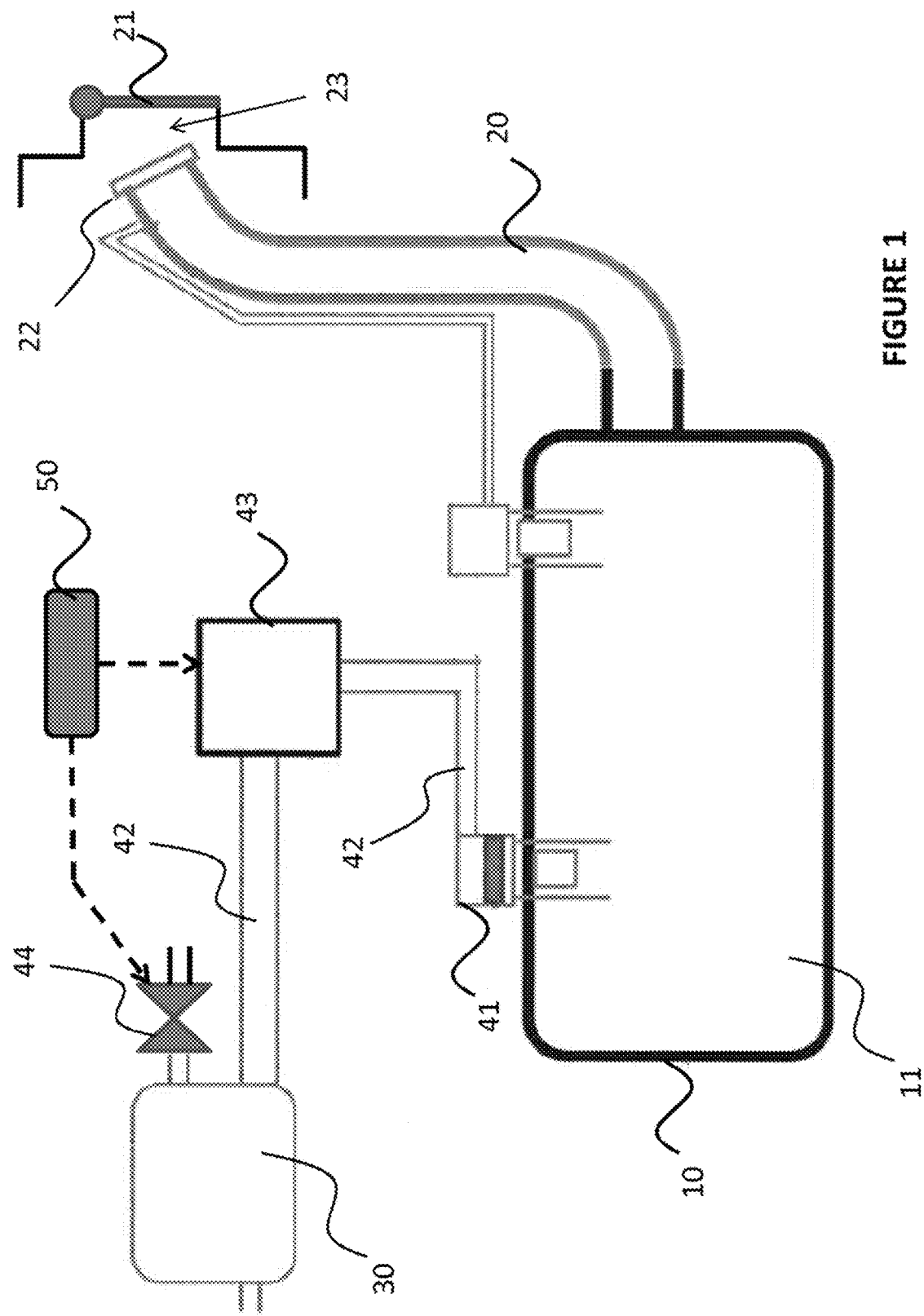

(52) U.S. Cl.
CPC ............... *B60K 2015/0319* (2013.01); *B60K 2015/0358* (2013.01); *B60K 2015/03203* (2013.01); *B60K 2015/03296* (2013.01); *B60K 2015/03514* (2013.01); *B60K 2015/03561* (2013.01); *B60K 2015/03566* (2013.01); *B60K 2015/03576* (2013.01); *B60K 2015/0561* (2013.01); *B60Y 2200/92* (2013.01)

(58) Field of Classification Search
CPC .......... B60K 2015/03576; B60K 2015/03203; B60K 2015/03296; B60K 2015/03566; B60K 2015/0319; B60K 2015/0323; B60K 2015/03381; B60K 2015/03394; B60K 2015/03561; F02M 25/08; F02M 2025/0845; F02D 41/04
See application file for complete search history.

(56) References Cited

U.S. PATENT DOCUMENTS

| | | | | |
|---|---|---|---|---|
| 6,321,727 | B1 * | 11/2001 | Reddy ............... | F02M 25/0809 123/520 |
| 2003/0075156 | A1 * | 4/2003 | Morinaga .......... | F02M 25/0809 123/520 |
| 2003/0085796 | A1 * | 5/2003 | Smith ................ | G07C 9/00182 340/5.7 |
| 2005/0035752 | A1 * | 2/2005 | Bertness ............. | G01R 31/007 324/120 |
| 2007/0239374 | A1 * | 10/2007 | Dougherty ............. | G01R 31/36 702/63 |
| 2009/0025694 | A1 | 1/2009 | Shinagawa et al. | |
| 2011/0166765 | A1 * | 7/2011 | DeBastos ......... | B60K 15/03504 701/102 |
| 2012/0152210 | A1 * | 6/2012 | Reddy ................ | F02M 25/089 123/520 |
| 2014/0209069 | A1 * | 7/2014 | Peters ................ | F02M 25/0809 123/520 |
| 2015/0101689 | A1 | 4/2015 | Balsdon et al. | |
| 2015/0292447 | A1 * | 10/2015 | Tagawa ............... | F02M 25/0809 137/198 |

FOREIGN PATENT DOCUMENTS

DE  10 2015 004657    10/2015
EP     3 025 892      6/2016

OTHER PUBLICATIONS

European Search Report dated Jan. 13, 2017 in European Patent Application No. EP 16 19 8716.

* cited by examiner

METHOD FOR CONTROLLING A PRESSURE INSIDE A FUEL TANK SYSTEM

The present application claims priority to and incorporates by reference the entire contents of EP16198716.9 filed on Nov. 14, 2016.

The present invention pertains to the field of vehicular liquid storage systems, in particular fuel tank systems. More in particular the invention relates to fuel tank systems for hybrid vehicles, fuel cells powered vehicles or non-hybrid internal combustion engine vehicles.

Fuel tank systems for motor vehicles are generally fitted, amongst other things, with a venting circuit. This circuit allows the pressure inside the fuel tank to foe relieved before a refueling operation occurs. In the known systems, the fuel tank system under high pressure is locked for access by the vehicle operator to avoid blowing fuel or fuel vapor onto the vehicle operator at the moment he or she opens the fuel tank, which could lead to injury or discomfort. The fuel tank system is unlocked for refueling only after the high pressure inside the fuel tank which can cause a vapor expulsion upon opening of the fuel tank by the vehicle operator, has been relieved via the venting circuit. In the known systems, the pressure relief is effectuated at a request of the vehicle operator, who typically has to push a button (or other suitable interface) on a vehicle dashboard in order to indicate a beginning of a refueling process. After the pressure relief has been carried out via one or several controllable pressure relief valves and lines in the venting circuit, the fuel tank is unlocked and the vehicle operator obtains access to the tank volume. Generally, the controllable pressure relief valve(s) require(s) a predetermined amount of energy from a source of energy on board the vehicle, to move from a closed position to a pressure relief position. Suitable source of energy can be herein the vehicle battery.

A disadvantage of the known systems is that the pressure cannot be relieved when the vehicle battery is partially or totally discharged. More precisely, the pressure cannot be relieved when the amount of electrical energy stored in the vehicle battery is lower than the predetermined amount of energy required to activate the controllable pressure relief valve(s).

As a result, the pressure inside the fuel tank remains high, and a risk of a vapor expulsion onto the vehicle operator exists when opening the fuel tank for a refueling operation.

It is an object of embodiments of the present invention to provide a method for controlling a pressure inside a fuel tank system which allows refueling of the tank when the vehicle battery is partially or totally discharged.

According to a first aspect of the invention there is provided a method for controlling a pressure inside a fuel tank system on board a vehicle, the fuel tank system comprising a fuel tank and a venting circuit having at least one controllable pressure relief valve, the vehicle comprising a source of energy adapted to activate said at least one pressure relief valve so as to move it from a closed position to a pressure relief position. The method comprises:
  detecting a key off event indicative of the vehicle shutdown;
  determining an amount of energy available at the source of energy;
  starting at least one pressure relief operation comprising the steps of:
    (i) verifying whether the amount of energy available is lower than a first predetermined threshold amount;
    (ii) if said verifying (i) is positive, activating said at least one pressure relief valve;
  terminating said at least one pressure relief operation.

Thus, it is proposed a depressurization control strategy based on the analysis of energy on board the vehicle. More precisely, the method of the present invention consists in activating and deactivating the pressure relief valve(s) (for example, System Isolation Valve and/or Tank Isolation Valve) upon the result of an energy comparison. According to an advantageous aspect of the present invention, the activation of the pressure relief valve(s) is conditioned to the detection of a low-energy risk situation, i.e. insufficient amount of energy available from the energy source to power the pressure relief valve(s). The idea behind the present invention is to allow safe reopening of a pressurized fuel tank system and refueling of the vehicle in the case that the battery voltage (for example) drops below the minimum requirement to power the pressure relief valve(s) (i.e. first predetermined threshold amount). Advantageously, the method further allows to unlock the fuel door (or fuel flap), such that an operator could open it to refuel. Thus, the method of the present invention allows an operator to refuel a vehicle that has been sitting with a dead battery and operate the internal combustion engine in order to charge the battery. The method of the present invention also prevents an operator from being sprayed with fuel if he manages to get the fuel door open while the vehicle is off.

In the present document, the term "activate the pressure relief valve" means supply energy to the pressure relief valve for promoting a depressurization, and the term "deactivate the pressure relief valve" means stop supplying said energy to the pressure relief valve.

Advantageously, the step of determining an amount of energy available at the source of energy may consist in measuring or estimating the current amount of electrical energy stored in the vehicle battery.

Advantageously, the step of terminating said at least one pressure relief operation comprises the steps of:
(iii) verifying whether the amount of energy available is greater than or equal to the first predetermined threshold amount;
(iv) if said verifying (iii) is positive, said at least one pressure relief valve operates in a normal operation mode.

According to a second aspect of the invention there is provided a method for controlling a pressure inside a fuel tank system on board a vehicle, the fuel tank system comprising a fuel tank and a venting circuit having at least one controllable pressure relief valve, the vehicle comprising a battery forming a source of energy adapted to activate said at least one pressure relief valve so as to move it from a closed position to a pressure relief position, wherein the method comprises:
  detecting a key off event indicative of the vehicle shutdown;
  determining a voltage available at the vehicle battery;
  starting at least one pressure relief operation comprising the steps of:
  (i) verifying whether the voltage available at the vehicle battery is lower than a first predetermined threshold amount;
  (ii) if said verifying (i) is positive, activating said at least one pressure relief valve;
  terminating said at least one pressure relief operation.

Advantageously, the step of terminating said at least one pressure relief operation comprises the steps of:
(iii) verifying whether the a voltage available at the vehicle battery is greater than or equal to the first predetermined threshold amount;
(iv) if said verifying (iii) is positive, said at least one pressure relief valve operates in a normal operation mode.

In an advantageous embodiment, the method comprises:
(a) determining an amount of fuel stored in the fuel tank;
(b) verifying whether the amount of fuel stored is lower than a second predetermined threshold amount;
(c) if said verifying (b) is positive, starting said at least one pressure relief operation.

Thus it is proposed to detect a need for refueling. By this way it is further possible to avoid overfilling.

In a particular embodiment, the fuel tank system comprises a locking system configured to prevent, in its locked state, a communication from being established between a storage volume of the fuel tank and a space accessible to an operator. According to an advantageous embodiment, the method further comprises a step of unlocking the locking system.

In a first advantageous embodiment, it is proposed to stop the depressurization when it is detected that there is a sufficient amount of energy available from the energy source to operate the pressure relief valve(s) in a normal operation mode (as described hereinafter). To this aim, the step of terminating said at least one pressure relief operation comprises the steps of:
(iii) verifying whether the amount of energy available is greater than or equal to the first predetermined threshold amount;
(iv) if said verifying (iii) is positive, said at least one pressure relief valve operates in a normal operation mode.

In a second advantageous embodiment, it is proposed to stop the depressurization when it is detected a key on event indicative of the vehicle start-up.

According to a further aspect, the invention relates to a fuel tank system comprising:
a fuel tank;
a venting circuit having at least one controllable pressure relief valve;
an electronic controller configured to:
detect a key off event indicative of the vehicle shut-down;
determine an amount of energy available at a source of energy on board the vehicle;
start at least one pressure relief operation and activate said at least one pressure relief valve, when the amount of energy available is lower than a first predetermined threshold amount;
terminate said at least one pressure relief operation.

According to another aspect of the invention the invention relates to a fuel tank system mountable on a vehicle, comprising:
a fuel tank;
a venting circuit having at least one controllable pressure relief valve;
an electronic controller configured to:
detect a key off event indicative of the vehicle shut-down;
determine a voltage available at a vehicle battery on board the vehicle;
start at least one pressure relief operation and activate said at least one pressure relief valve, when the voltage available at the vehicle battery is lower than a first predetermined threshold amount;
terminate said at least one pressure relief operation.

Advantageously, the electronic controller is further configured to perform the steps of the method as described above.

According to another aspect of the invention, there is provided a plug-in hybrid vehicle comprising the fuel tank system described above.

Figure 3:
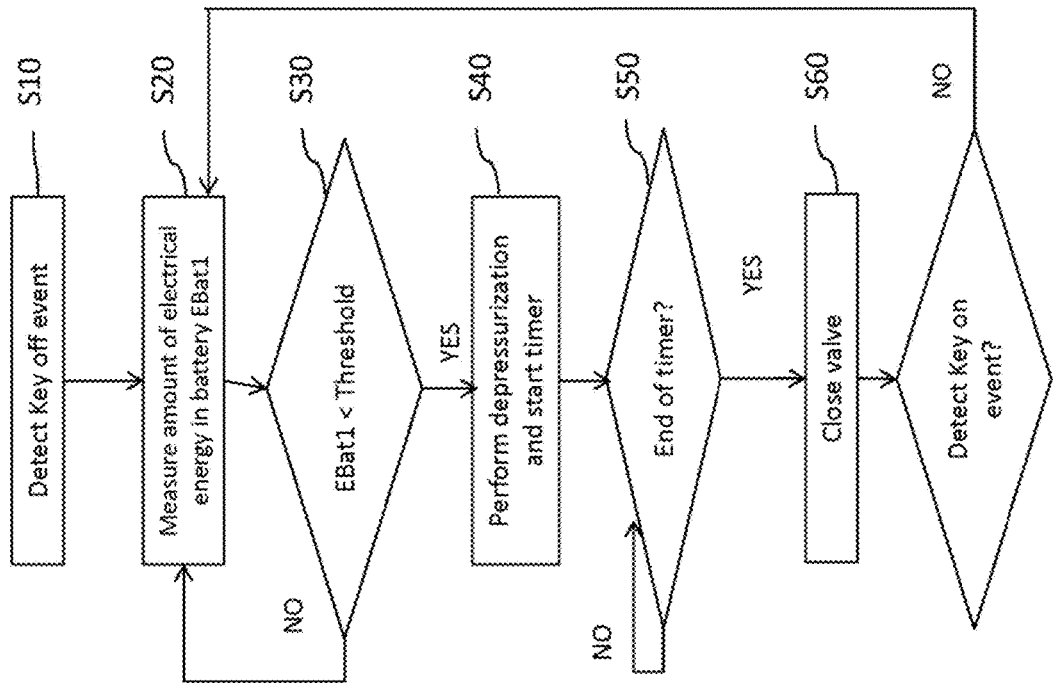
Figure 2:
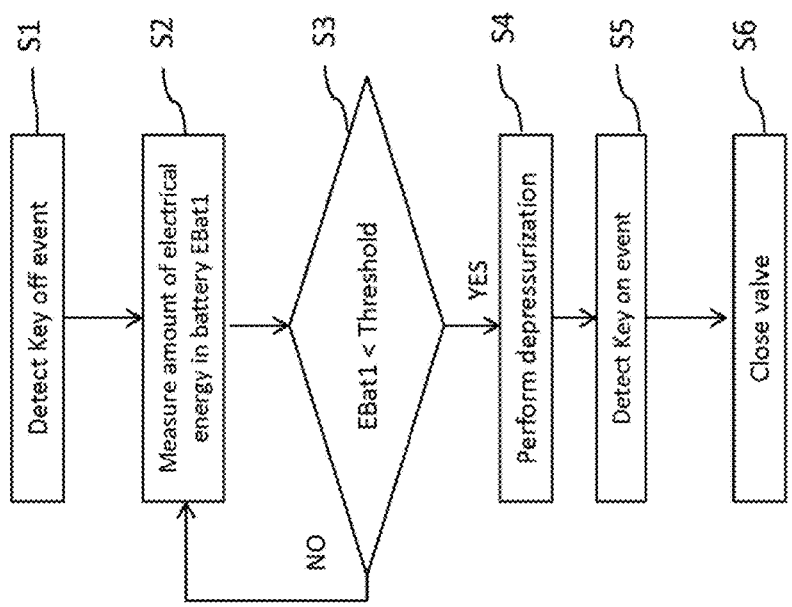

The accompanying drawings are used to illustrate presently preferred non-limiting exemplary embodiments of devices of the present invention. The above and other advantages of the features and objects of the invention will become more apparent and the invention will be better understood from the following detailed description when read in conjunction with the accompanying drawings, in which:

FIG. 1 is a diagram illustrating an exemplary embodiment of a fuel tank system using controllable pressure relief valves and to which the method of the present invention may be applied;

FIG. 2 illustrates an exemplary flow chart of instructions depicting logical operational steps for activating and deactivating the controllable pressure relief valves of FIG. 1, according to a first particular embodiment; and FIG. 3 illustrates an exemplary flow chart of instructions depicting logical operational steps for activating and deactivating the controllable pressure relief valves of FIG. 1, according to a second particular embodiment.

FIG. 1 illustrates an exemplary embodiment of a fuel tank system on board a vehicle. The fuel tank system comprises a fuel tank 10, a filler pipe arrangement 20, a filter unit 30, and a venting circuit.

In this exemplary embodiment, a locking system is configured to prevent, in its locked state, a communication from being established between the storage volume 11 of the fuel tank and a space 23 accessible to an operator. The locking system may comprise a fuel flap 21 (or fuel door) and a fuel cap 22.

The fuel tank 10 is in fluid communication with the filter unit 30, here a canister, via the venting circuit. In the illustrated example, the fuel tank 10 is connected to the canister 30 via a venting valve 41 and a venting line 42. A first pressure relief valve 43 (or TIV for Tank Isolation Valve) is disposed in the venting line 42 for isolating the fuel tank 10 from the canister 30 to avoid unwanted loading of the canister 30. There is an additional communication between the canister 30 and the atmosphere. This communication can be selectively controlled via a second pressure relief valve 44 (or SIV for System Isolation Valve) to create a completely sealed system.

For example, in a normal operation mode, during filling or at elevated temperatures, the first and second pressure relief valves (43, 44) are open (i.e. pressure relief position), so that fuel vapour can flow from the fuel tank 10 into the canister 30, and fresh air can flow out in the atmosphere through the second pressure relief valve 44, allowing the pressure in the fuel tank to be reduced. During normal engine operation, the first pressure relief valve 43 may be closed while the second pressure relief valve 44 is open to allow the flow of air into the outlet of the canister, through the canister medium and through a canister purge valve allowing the fuel vapour stored in the canister to be delivered to the engine.

At key off, i.e. when the vehicle shuts down, the first and second pressure relief valves (43, 44) are in a closed position.

In another particular embodiment, only one of the first and second pressure relief valves (43, 44) can be used.

An electronic controller 50 (or an electronic control unit (ECU)) is configured for controlling operation (opening/closing) of the first and second pressure relief valves (43, 44) (and optionally the fuel flap 21). In the example of FIG. 1, the first and second pressure relief valves (43, 44) are powered by the vehicle battery (not shown).

The controller 50 includes a series of computer-executable instructions, as described below in relation to FIGS. 2 and 3. These instructions may reside, for example, in a RAM of the controller. Alternatively, the instructions may foe contained on a data storage device with a computer readable medium (for example, USB key or CD-ROM).

In a first particular embodiment, each of the first and second pressure relief valves (43, 44) can be a stepper-motor-driven type valve, i.e. actuated by a stepping motor.

FIG. 2 illustrates an exemplary flow chart of instructions depicting logical operational steps for activating and deactivating the first and second pressure relief valves (43, 44), according to the first particular embodiment.

At step S1, the controller 50 detects a key off event indicative of the vehicle shut-down.

At step 32, the controller 50 obtains a measurement of the amount of electrical energy stored in the vehicle battery. The amount of energy available in a battery is also called the state of charge of the battery. It can be defined based on the voltage measurement, preferably when the vehicle is off and the electrical consumption is limited. A table links the voltage and the state of charge. To get more accurate results the table can integrate the temperature and the current consumption. This method is particularly valid for lead acid batteries. The voltage range 13.5 V to 11.5 V is almost representative of the state of charge range 100% to 0%. For nickel- and lithium-based batteries, the table allows to detect only the low state of charge. A voltage higher than 12 V is representative of the state of charge higher than 10%. But when it drops below 12V the state of charge is low. Thanks to the table links, the energy stored on board the vehicle is an image of the voltage available at the vehicle battery. This step S2 can be executed in a continuous mode or at frequent intervals, for example every hour.

At step S3, the controller 50 performs a test which consists in determining whether the measured amount of electrical energy stored in the vehicle battery fat step S2) is lower than a predetermined threshold amount. For example, this threshold can be set such that it corresponds to 11 Volts, for a battery of 12 Volts. If the answer to test S3 is "yes", the controller 50 executes step S4. On the other hand, if the answer to test S3 is "no", the process return to step S2.

At step S4, a depressurization of the fuel tank system is performed. More precisely, at step S4 the controller 50 powers the stepping motor of each pressure relief valve (43, 44) such that each pressure relief valve (43, 44) moves from a closed position to a pressure relief position. In such pressure relief position, each pressure relief valve (43, 44) can be partially or totally open. Once each pressure relief valve (43, 44) is in the pressure relief position the controller 50 stops powering the stepping motors. The first and second pressure relief valves (43, 44) are maintained in their pressure relief position. At this point the fuel tank system is in a safe state to perform at least a partial refueling. For example if a normal refueling is happening at a rate of 40 liters per minute, in a safe state only 5-10 liters per minute would be achievable. This allows the operator to put fuel in but discourages him from overfilling.

At step S5, the controller 50 detects a key on event indicative of the vehicle start-up.

At step 36 the controller 50 powers the stepping motor of each pressure relief valve (43, 44) such that each pressure relief valve (43, 44) moves from the pressure relief position to the closed position. Then, the first and second pressure relief valves (43, 44) return in a normal operation mode (as described above).

In a second particular embodiment, each of the first and second pressure relief valves (43, 44) can be a solenoid-type valve, i.e. actuated by an electromechanical actuator.

FIG. 3 illustrates an exemplary flow chart of instructions depicting logical operational steps for activating and deactivating the first and second pressure relief valves (43, 44), according to the second particular embodiment.

At step S10, the controller 50 detects a key off event indicative of the vehicle shut-down.

At step S20, the controller 50 obtains a measurement of the amount of electrical energy stored in the vehicle battery. The correlation between energy available on a board the vehicle and voltage available at the vehicle battery is achieved thanks to the same table links detailed in the precedent embodiment at step S2. This step 320 can be executed in a continuous mode or at frequent intervals, for example every hour.

At step S30, the controller 50 performs a test which consists in determining whether the measured amount of electrical energy stored in the vehicle battery (at step S20) is lower than a predetermined threshold amount. For example, this threshold can be set such that it corresponds to 11 Volts, for a battery of 12 Volts. If the answer to test S30 is "yes", the controller 50 executes step S40. On the other hand, if the answer to test S30 is "no", the process return to step S20.

At step 340, a depressurization of the fuel tank system is performed. More precisely, at step S40 the controller 50 powers the solenoid coil of each pressure relief valve (43, 44) such that each pressure relief valve (43, 44) moves from a closed position to a pressure relief position. In such pressure relief position, each pressure relief valve (43, 44) can be partially or totally open. At this point the fuel tank system is in a safe state to perform at least a partial refueling. In an advantageous embodiment of step S40, once each pressure relief valve (43, 44) is in the pressure relief position the controller 50 starts a timer for a predetermined amount of time.

At step S50, the controller 50 determines whether or not the timer is expired. If the timer is expired, then the controller 50 executes step S60. If the timer is not expired, then the controller 50 maintains the powering of the solenoid coil of each pressure relief valve (43, 44) such that each pressure relief valve (43, 44) stays in the pressure relief position.

At step 360, the controller 50 stops powering the solenoid coils. The first and second pressure relief valves (43, 44) then return in the closed position.

In an advantageous embodiment, steps S20 to 360 can be repeated until the controller 50 detects a key on event indicative of the vehicle start-up. For example, upon detection of a key on event, the first and second pressure relief valves (43, 44) return in a normal operation mode (as described above).

Optionally, the execution of step S2 in FIG. 2 (or step S20 in FIG. 3) can be conditioned to depend on whether the amount of fuel stored in the tank is lower than a predetermined threshold amount. For example, this threshold amount can be set such that it corresponds to 45 Liters, for a fuel tank with a maximum storage volume of 50 Liters. According to this optional embodiment, the controller 50 determines (i.e. measures or estimates) the amount of fuel stored in the tank; and if the amount of fuel stored in the tank is lower than 45 Liters, then the controller 50 passes to step S2 in FIG. 2 (or step S20 in FIG. 3); and if not, then the controller 50 keeps monitoring the amount of fuel stored in the tank (in a continuous mode or for predetermined time). This can avoid overfilling when refueling with a 5 Liters jerry can, for example.

Optionally, the execution of step S2 in FIG. 2 for step S20 in FIG. 3) can be conditioned to depend on whether the pressure inside the tank is greater than a predetermined pressure threshold. For example, this threshold can be set such that it corresponds to 15 mbar. According to this optional embodiment, the controller 50 determines (i.e. measures or estimates) the pressure inside the tank; and if the pressure inside the tank is greater than 15 mbar, then the controller 50 passes to step S2 in FIG. 2 (or step S20 in FIG. 3); and if not, then the controller 50 keeps monitoring the pressure inside the tank (in a continuous mode or for predetermined time).

Optionally, at step S4 in FIG. 2 or step S40 in FIG. 3, the controller 50 can open the fuel flap 21 of FIG. 1.

Where reference is made in the above description to a "vehicle operator", this refers without limitation to any person who, at a given time, is involved in the operations concerning the vehicle. It may be a gas station attendant, a driver, a mechanic, etc.

Throughout this application, the terms "depressurization" and "pressure relief" are used to designate the process of balancing the internal fuel system pressure with the ambient pressure. Balancing implies getting the internal fuel system pressure within a small difference of the ambient pressure; this difference may be between −50 mbar and 50 mbar; it is preferably between −20 mbar and 20 mbar; and even more preferably between −10 mbar and 10 mbar.

Whilst the principles of the invention have been set out above in connection with specific embodiments, it is to be understood that this description is merely made by way of example and not as a limitation of the scope of protection which is determined by the appended claims.

The invention claimed is:

1. A method for controlling a pressure inside a fuel tank system on board a vehicle, the fuel tank system comprising a fuel tank, a canister, and a venting circuit having at least one controllable pressure relief valve, the vehicle comprising a source of energy adapted to activate said at least one pressure relief valve, located between the canister and the tank, and so as to move it from a closed position to a pressure relief position, wherein the method comprises:
   detecting a key off event indicative of the vehicle shut-down;
   determining an amount of energy available at the source of energy;
   starting at least one pressure relief operation comprising:
   verifying whether the amount of energy available is lower than a first predetermined threshold amount; and, if said verifying is positive, activating said at least one pressure relief valve from a closed position to an open position such that the tank is depressurized, and
   terminating said at least one pressure relief operation.

2. The method according to claim 1, wherein the terminating said at least one pressure relief operation comprises:
   verifying whether the amount of energy available is greater than or equal to the first predetermined threshold amount; and
   if said verifying is positive, said at least one pressure relief valve operates in a normal operation mode.

3. The method according to claim 1, the fuel tank system comprising a locking system configured to prevent, in its locked state, a communication from being established between a storage volume of the fuel tank and a space accessible to an operator, and wherein, if said verifying is positive, the method further comprises unlocking the locking system.

4. The method according to claim 1, wherein the terminating said at least one pressure relief operation comprises:
   detecting a key on event indicative of the vehicle start-up; and
   operating said at least one pressure relief valve in a normal operation mode.

5. The method according to claim 1, wherein the method comprises:
   determining an amount of fuel stored in the fuel tank;
   verifying whether the amount of fuel stored is lower than a second predetermined threshold amount; and
   if said verifying is positive, starting said at least one pressure relief operation.

6. A method for controlling a pressure inside a fuel tank system on board a vehicle, the fuel tank system comprising a fuel tank, a canister, and a venting circuit having at least one controllable pressure relief valve, the vehicle comprising a battery forming a source of energy adapted to activate said at least one pressure relief valve, located between the canister and the tank, and so as to move it from a closed position to a pressure relief position, wherein the method comprises:
   detecting a key off event indicative of the vehicle shut-down;
   determining a voltage available at the vehicle battery;
   starting at least one pressure relief operation comprising:
   verifying whether the voltage available at the vehicle battery is lower than a first predetermined threshold amount; and, if said verifying is positive, activating said at least one pressure relief valve from a closed position to an open position such that the tank is depressurized,
   terminating said at least one pressure relief operation.

7. The method according to claim 6, wherein the terminating said at least one pressure relief operation comprises:
   verifying whether the voltage available at the vehicle battery is greater than or equal to the first predetermined threshold amount; and
   if said verifying is positive, said at least one pressure relief valve operates in a normal operation mode.

8. A fuel tank system mountable on a vehicle, comprising:
   a fuel tank;
   a canister;
   a venting circuit having at least one controllable pressure relief valve, wherein said at least one controllable pressure relief valve is located between the canister and the tank; and
   an electronic controller configured to:
   detect a key off event indicative of the vehicle shut-down;
   determine an amount of energy available at a source of energy on board the vehicle;
   start at least one pressure relief operation and activate said at least one pressure relief valve from a closed position to an open position such that the tank is depressurized, when the amount of energy available is lower than a first predetermined threshold amount; and
   terminate said at least one pressure relief operation.

9. A plug-in hybrid vehicle comprising the fuel tank system according to claim 8.

10. The fuel tank system of claim 8, wherein the electronic controller is further configured to perform the method for controlling a pressure inside the fuel tank system on board a vehicle, the fuel tank system comprising the fuel tank, the canister, and the venting circuit having at least one controllable pressure relief valve the vehicle comprising the source of energy adapted to activate said at least one pressure relief valve, located between the canister and the tank, so as to move it from a closed position to a pressure relief position, wherein the method comprises:
   detecting the key off event indicative of the vehicle shut-down;

determining the amount of energy available at the source of energy;
starting at least one pressure relief operation comprising:
verifying whether the amount of energy available is lower than the first predetermined threshold amount; and, if said verifying is positive, activating said at least one pressure relief valve from a closed position to an open position such that the tank is depressurized, and
terminating said at least one pressure relief operation.

11. A fuel tank system mountable on a vehicle, comprising:
a fuel tank;
a canister;
a venting circuit having at least one controllable pressure relief valve, wherein said at least one controllable pressure relief valve is located between the canister and the tank; and
an electronic controller configured to:
detect a key off event indicative of the vehicle shut-down;
determine a voltage available at a vehicle battery on board the vehicle;
start at least one pressure relief operation and activate said at least one pressure relief valve from a closed position to an open position such that the tank is depressurized, when the voltage available at the vehicle battery is lower than a first predetermined threshold amount; and
terminate said at least one pressure relief operation.

* * * * *

UNITED STATES PATENT AND TRADEMARK OFFICE
CERTIFICATE OF CORRECTION

PATENT NO. : 10,350,992 B2
APPLICATION NO. : 15/710298
DATED : July 16, 2019
INVENTOR(S) : David Hill et al.

Page 1 of 1

It is certified that error appears in the above-identified patent and that said Letters Patent is hereby corrected as shown below:

On the Title Page

Item (30), the Foreign Application Priority Data is incorrect. Item (30) should read:
-- (30) Foreign Application Priority Data
Nov. 14, 2016 (EP) .......... 16198716.9 --

Signed and Sealed this
Tenth Day of September, 2019

Andrei Iancu
*Director of the United States Patent and Trademark Office*